(12) United States Patent
Misevski

(10) Patent No.: US 7,350,796 B2
(45) Date of Patent: Apr. 1, 2008

(54) CRANK APPARATUS FOR BICYCLES AND THE LIKE

(76) Inventor: Nenad Misevski, 514-9th Street, Saskatoon, Saskatchewan (CA) S7M 0B1

( * ) Notice: Subject to any disclaimer, the term of this patent is extended or adjusted under 35 U.S.C. 154(b) by 316 days.

(21) Appl. No.: 11/174,921

(22) Filed: Jul. 5, 2005

(65) Prior Publication Data

US 2006/0027994 A1 Feb. 9, 2006

(30) Foreign Application Priority Data

Jul. 5, 2004 (CA) .................................... 2472850

(51) Int. Cl.
*B62M 1/02* (2006.01)
(52) U.S. Cl. .................... 280/259; 280/260; 74/594.3; 74/594.1
(58) Field of Classification Search ................ 280/259, 280/260; 74/594.1, 594.3
See application file for complete search history.

(56) References Cited

U.S. PATENT DOCUMENTS

| 4,807,491 A | * | 2/1989 | Stuckenbrok | .............. 74/594.1 |
| 5,879,017 A | * | 3/1999 | Debruin | ...................... 280/259 |
| 6,640,662 B1 | * | 11/2003 | Baxter | ....................... 74/594.3 |

\* cited by examiner

*Primary Examiner*—Paul N. Dickson
*Assistant Examiner*—Michael Stabley
(74) *Attorney, Agent, or Firm*—Adams Intellectual Property Law, P.A.

(57) ABSTRACT

A crank apparatus includes a driven member rotatably mounted to a machine, and a crank arm attached at an inner end thereof to the driven member at a rotational axis of the driven member such that the driven member and crank arm rotate together. An axle is slidably mounted to the crank arm such that the axle is maintained substantially parallel to the rotational axis of the driven member as it slides from an inner point on the crank arm, to an outer point on the crank arm, and a bias element is arranged to exert a force on the axle toward the rotational axis of the driven member.

20 Claims, 2 Drawing Sheets

PEDAL PATH –
– CONVENTIONAL CRANK

PEDAL PATH –
– CRANK WITH SPRING

CRANK APPARATUS FOR BICYCLES AND THE LIKE

FIELD OF THE INVENTION

This invention is in the field of machines with rotating members, and in particular crank mechanisms for providing power to rotate such members, for example pedal mechanisms for bicycles.

BACKGROUND OF THE INVENTION

Crank mechanisms are known furrow opener providing power to rotate a member, for example, pedals on bicycles. The pedals are conventionally attached to a circular sprocket to drive a chain to drive the bicycle wheel and provide propulsion. Typically the rider pushes down once the pedal reaches the top of its cycle to provide the force required to rotate the sprocket, and once the pedal reaches the bottom of the cycle no more force can be applied to rotate the sprocket. Then the opposite foot pushes down on the opposite pedal to provide the required force.

The rider's foot follows a circular path as the bicycle travels and the sprocket revolves. Only the force components that are tangential to the circular path at any given point on the cycle act in the direction required to rotate the sprocket. At a location 90° forward from the top of the pedal cycle, the downward force of the rider's foot is all going toward rotating the sprocket, however at all other points in the cycle only a portion of the downward force is in the proper direction to rotate the sprocket.

SUMMARY OF THE INVENTION

It is an object of the present invention to provide a crank apparatus that overcomes problems in the prior art.

In a first embodiment the invention provides a crank apparatus comprising a driven member rotatably mounted to a machine, and a crank arm attached at an inner end thereof to the driven member substantially at a rotational axis of the driven member such that the driven member and crank arm rotate together. An axle is slidably mounted to the crank arm such that the axle is maintained substantially parallel to the rotational axis of the driven member as it slides from an inner point on the crank arm, to an outer point on the crank arm, and a bias element is arranged to exert a force on the axle toward the rotational axis of the driven member.

In a second embodiment the invention provides a bicycle crank apparatus comprising a sprocket rotatably mounted to a bicycle, and a crank arm attached at an inner end thereof to the sprocket substantially at a rotational axis of the sprocket such that the sprocket and crank arm rotate together. A slot is defined along a length of the crank arm, and an axle is slidably mounted in the slot such that the axle is maintained substantially parallel to the rotational axis of the sprocket as it slides from an inner end of the slot, closer to the rotational axis of the sprocket, to an outer end of the slot. A bias element arranged to exert a force on the axle toward the inner end of the slot.

The crank apparatus of the invention is well suited to application on a bicycle, and could be adapted to similar crank rotated machinery. In a bicycle application of the crank apparatus, the rider's foot does not travel a circular path as in the prior art, but follows an elliptical path such that the force exerted by the rider's foot on a down stroke is exerted farther from the sprocket axis thereby increasing the moment on the sprocket, and thus exerting a greater turning force on the sprocket.

In a bicycle application, the pedal axle extends substantially perpendicular out from a crank arm, and the pedal axle can slide back and forth along the crank arm. The crank arm is mounted to a chain sprocket and rotates around a sprocket axis. A bias element exerts a force on the pedal axle towards the sprocket axis, such that when at rest, the pedal axis is at a location closest to the sprocket axis. As the axle and sprocket rotate in response to a force exerted by a rider's foot on the pedal, the axle moves through a range from a retracted position, closest to the sprocket axis, to an extended position, farthest from the sprocket axis.

From a position at the top of the pedal rotation, for reference 0°, to a position one quarter of the way around the cycle at 90°, the pedal axle is generally at the retracted position closest to the sprocket axis. As the pedal axle moves past 90° the downward force of the rider's foot forces the pedal axle out along the crank arm against the force of the bias element. Since the pedal axis moves outward along the crank arm, the effective length of the crank arm is increased, increasing the moment arm to which the pedal force is applied and thus transmitting more force to the sprocket as well.

Further the elliptical path of the rider's feet using the invention corresponds somewhat more to a walking movement and is thus contemplated to be less stressful and more comfortable compared to the conventional circular path. The bias force can be varied by varying the strength of the spring. It may be desirable to have a fairly strong spring such that the axle remains retracted during travel on level ground, and moves to the extended position only when an added force is exerted by the rider, such as when climbing a grade. The bias force can be varied to suit individual riders and the conditions in which they will be riding.

It is contemplated that the invention could be applied to other machines where a force is exerted on a crank arm laterally to the axis of a shaft attached to the crank arm to rotate a sprocket, wheel, or the like.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
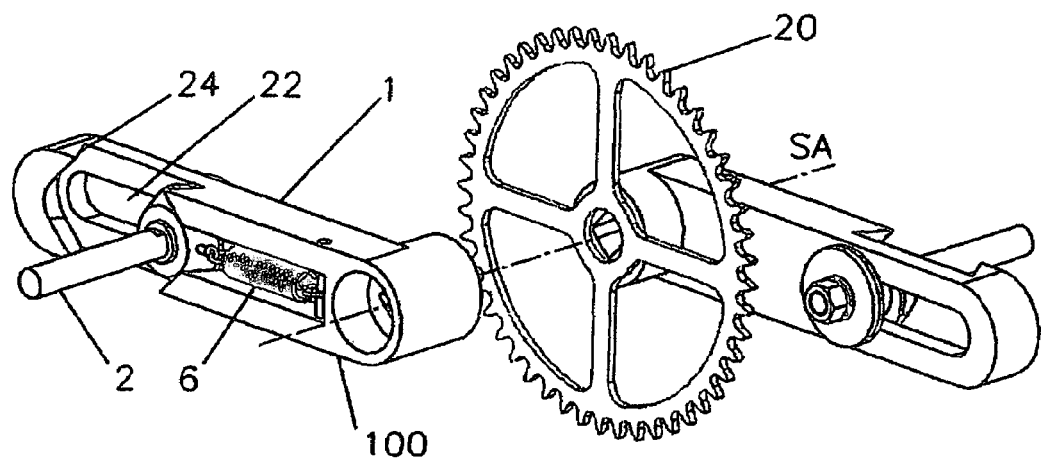
FIG. 1 is a perspective view of a crank apparatus of the invention.
Figure 2:
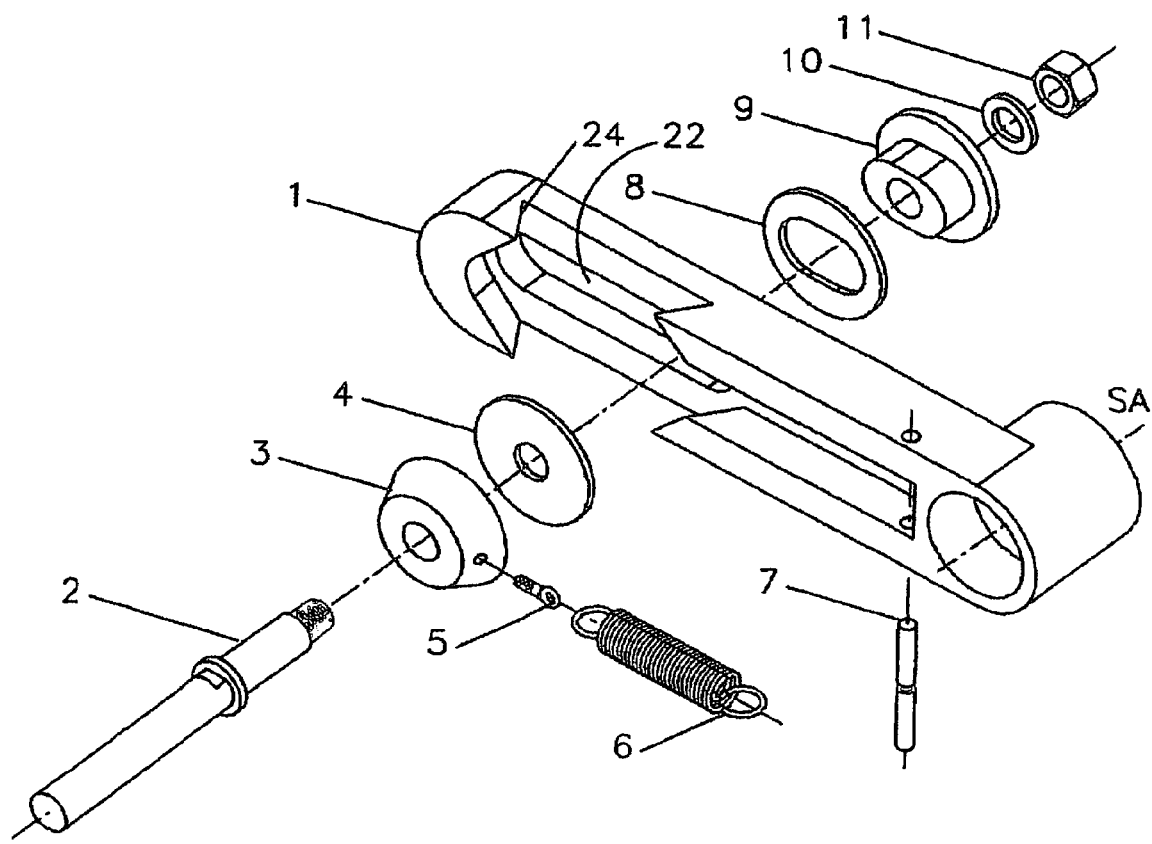
FIG. 2 is an exploded perspective view of the crank apparatus of FIG. 1.

FIG. 1 illustrates a crank apparatus 100 of the invention. A crank arm 1 is attached to a driven member that is rotatably mounted to a machine. In the illustrated embodiment the driven member is illustrated as a bicycle sprocket 20. The attachment of the crank arm is substantially at the rotational axis of the sprocket 20 such that the sprocket 20 and crank arm 1 rotate together about the sprocket axis SA. An axle 2 is slidably mounted in the crank arm 1 the axle 2 is maintained substantially parallel to the rotational axis of the sprocket 20 as it slides from an inner point on the crank arm 1 to an outer point on the crank arm 1.

In the illustrated embodiment, the crank arm 1 defines a slot 22 along a length thereof. An axle 2 is slidably mounted in the slot 22 such that the axle 2 is maintained substantially parallel to the rotational axis of the sprocket 20 as it slides from an inner end of the slot 22, closer to the sprocket axis SA, to an outer end of the slot 22. A force exerted on the axle 2 causes the crank arm 1 and the sprocket 20 to rotate. Typically on a bicycle a pedal is rotatably mounted to the axle 2 to receive force from an rider's foot to rotate the crank arm 1 and sprocket 20.

A slot spacer 9 is engaged in the slot 22, and washers 4, 8 are positioned on each side of the crank arm 1. The axle passes through the slot spacer 9 and the washers 4, 8 and is fastened with a nut 11 and lock washer 10 so as to secure the slot spacer 9 in the slot 22 with a washer 4, 8 on each side of the crank arm 1 and to thereby maintain the axle substantially parallel to the rotational axis of the driven member.

In the illustrated embodiment a resilient bumper 3 is also mounted on the axle 2 adjacent to the outside of the crank arm 1, and outer and inner stops are attached to the crank arm 1 and located such that the bumper 3 contacts the outer stop when the axle moves to the outer end of the slot and contacts the inner stop when the axle moves to the inner end of the slot. In the illustrated embodiment, the bumper 3 has a truncated conical shape with a wider end thereof located adjacent to the crank arm 1, and the outer and inner stops are provided by cone-shaped grooves 24 at each end of the slot 22 configured to receive the bumper 3. Thus when the axle 2 reaches either end of the slot 22, the bumper 3 contacts one of the grooves 24 and cushions the axle 2.

A bias element, illustrated as a spring 6, is arranged to exert a force on the axle 2 toward the inner end of the slot 22. The illustrated spring 6 is located in a recess in the crank arm 1 extending between the inner end of the slot 22 and the rotational axis of the sprocket 20. The spring 6 is attached to the axle 2 by an eye bolt 5 attached to the bumper 3 at an outer end thereof, and is attached to the crank arm 1 by a pin 7 at an inner end thereof. The spring 6 is removable by removing the pin 7 and disengaging the outer end from the eye bolt 5 so that the spring 6 can be changed. Springs 6 with different strengths can thus be substituted to find the right spring force for any particular rider or riding conditions.

Thus the axle 2 is secured such that same can slide in the slot 22 from a retracted position at the end of the slot closest to the sprocket axis SA to an extended position at the opposite outer end of the slot 22. The spring 6 acts as a bias element to exert a bias force on the pedal axle 2 such that when at rest, the pedal axle 2 is in the retracted position, and when an outward force is exerted on the pedal axle 2 by a rider's foot that is sufficient to overcome the force of the spring 6, the axle 2 moves toward the extended position.

Figures 3, 4:
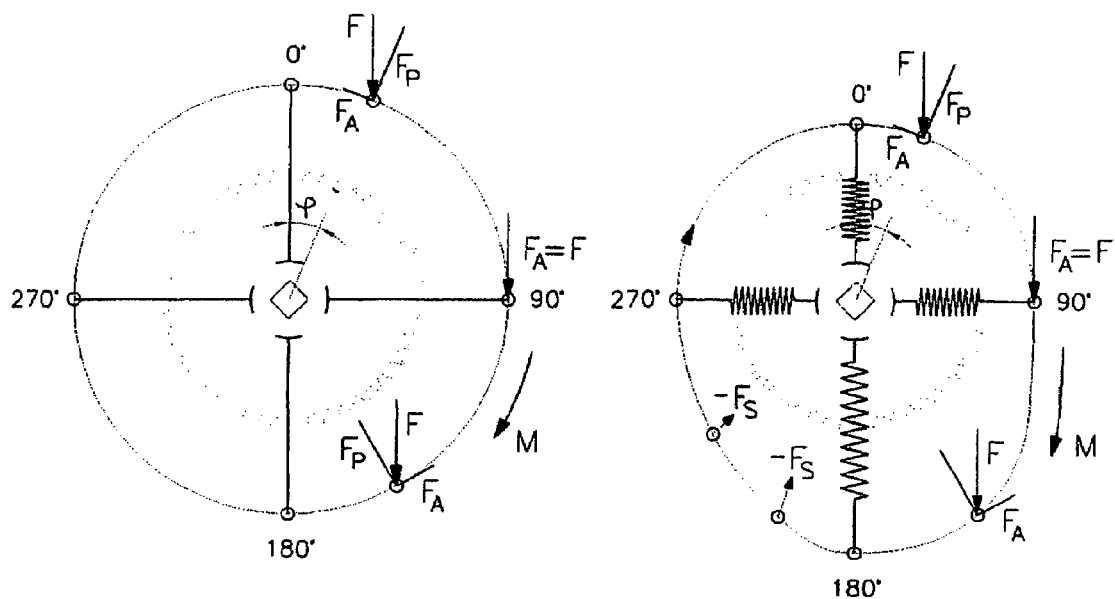
FIG. 3 is a schematic side view of the path of a conventional pedal axle.
FIG. 4 is a schematic side view of the path of a pedal axle with the crank apparatus of FIG. 1.

FIG. 3 illustrates the circular path of a conventional pedal axle and FIG. 4 illustrates the elliptical path of the axle of the present invention. In FIG. 3, the downward force F applied by a rider's foot is indicated as broken down into two components. Active component FAA is tangential to the path and so acts to exert a rotational force to the sprocket. Passive component UP is normal to the path and so exerts no rotational force on the sprocket and is essentially wasted.

As can be seen in FIG. 4 illustrating the axle path of the present invention, from the position at 90° the axle moves substantially straight down, such that the distance between the axle and the sprocket axis increases. The moment M exerted on the sprocket is a product of the force component FAA times the distance from the force to the sprocket axis SA. Thus as the axle moves toward the extended position it moves farther away from the sprocket axis and the moment increases, increasing the utility of the forces applied by the rider.

It is also contemplated that when the rider exerts a considerable downward force on the axle at 90°, the pedal axle will move out rapidly to the extended position and exert an impact force on the crank arm that will help carry the crank arm around and past 180° such that the opposite pedal is in a position forward of 0° where the force exerted by the rider has at least some active component FAA. Conventionally there is a dead spot in the cycle when one pedal is at 180° and the other is at 0°, and there is no active force component FAA on either pedal.

As the axle moves past 180°, the rider removes the force from his foot and thus the axle, and spring force AS draws the axle inward along the slot, and raises the rider's foot as well.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A crank apparatus comprising:
   a driven member rotatably mounted to a machine;
   a crank arm attached at an inner end thereof to the driven member substantially at a rotational axis of the driven member such that the driven member and crank arm rotate together;
   an axle slidably mounted to the crank arm such that the axle is maintained substantially parallel to the rotational axis of the driven member as it slides from an inner stop on the crank arm, to an outer stop on the crank arm; and
   a bias element arranged to exert a bias force on the axle toward the inner stop, such that at rest the axle is forced against the inner stop by the bias force, and such that an outward force on the axle greater than the bias force will cause the axle to move toward the outer stop.

2. The apparatus of claim 1 comprising a slot defined along a length of the crank arm and wherein the axle is slidably mounted in the slot.

3. The apparatus of claim 2 comprising a slot spacer engaged in the slot, and a washer on each side of the crank arm, wherein the axle passes through the slot spacer and the washers and is fastened so as to secure the slot spacer in the slot with a washer on each side of the crank arm and to thereby maintain the axle substantially parallel to the rotational axis of the driven member.

4. The apparatus of claim 3 further comprising a resilient bumper mounted on the axle adjacent to an outside of the crank arm, and an outer stop attached to the crank arm and located such that the bumper contacts the outer stop when the axle moves to the outer end of the slot.

5. The apparatus of claim 4 further comprising an inner stop attached to the crank arm and located such that the bumper contacts the inner stop when the axle moves to the inner end of the slot.

6. The apparatus of claim 4 wherein the bumper has a truncated conical shape with a wider end thereof located adjacent to the crank arm, and wherein the outer stop has a corresponding shape to receive the bumper.

7. The apparatus of claim 1 wherein the bias element comprises a spring located in a recess in the crank arm extending between the inner end of the slot and the rotational axis of the driven member, and wherein the spring is attached at an outer end thereof to the axle and is attached at an inner end thereof to the crank arm.

8. The apparatus of claim 7 wherein the spring is removably attached such that a first spring having a first strength can be removed and replaced by a second spring having a second strength different from the first strength.

9. A bicycle crank apparatus comprising:
a sprocket rotatably mounted to a bicycle;
a crank arm attached at an inner end thereof to the sprocket substantially at a rotational axis of the sprocket such that the sprocket and crank arm rotate together;
a slot defined along a length of the crank arm;
an axle slidably mounted in the slot such that the axle is maintained substantially parallel to the rotational axis of the sprocket as it slides from an inner end of the slot, closer to the rotational axis of the sprocket, to an outer end of the slot; and
a bias element arranged to exert a bias force on the axle toward the inner end of the slot such that at rest the axle is forced against the inner end of the slot by the bias force, and such that an outward force on the axle greater than the bias force will cause the axle to move toward the outer end of the slot.

10. A bicycle crank apparatus comprising:
a sprocket rotatably mounted to a bicycle;
a crank arm attached at an inner end thereof to the sprocket substantially at a rotational axis of the sprocket such that the sprocket and crank arm rotate together;
a slot defined along a length of the crank arm;
an axle slidably mounted in the slot such that the axle is maintained substantially parallel to the rotational axis of the sprocket as it slides from an inner end of the slot, closer to the rotational axis of the sprocket, to an outer end of the slot;
a bias element arranged to exert a bias force on the axle toward the inner end of the slot; and
a slot spacer engaged in the slot, and a washer on each side of the crank arm;
wherein the axle passes through the slot spacer and the washers and is fastened so as to secure the slot spacer in the slot with a washer on each side of the crank arm and to thereby maintain the axle substantially parallel to the rotational axis of the sprocket.

11. The apparatus of claim 10 further comprising a resilient bumper mounted on the axle adjacent to the outside of the crank arm, and an outer stop attached to the crank arm and located such that the bumper contacts the outer stop when the axle moves to the outer end of the slot.

12. The apparatus of claim 11 further comprising an inner stop attached to the crank arm and located such that the bumper contacts the inner stop when the axle moves to the inner end of the slot.

13. The apparatus of claim 11 wherein the bumper has a truncated conical shape with a wider end thereof located adjacent to the crank arm, and wherein the outer stop has a corresponding shape to receive the bumper.

14. The apparatus of claim 9 wherein the bias element comprises a spring located in a recess in the crank arm extending between the inner end of the slot and the rotational axis of the sprocket, and wherein the spring is attached at an outer end thereof to the axle and is attached at an inner end thereof to the crank arm.

15. The apparatus of claim 14 wherein the spring is removably attached such that a first spring having a first strength can be removed and replaced by a second spring having a second strength different from the first strength.

16. The apparatus of claim 9 comprising a slot spacer engaged in the slot, and a washer on each side of the crank arm, wherein the axle passes through the slot spacer and the washers and is fastened so as to secure the slot spacer in the slot with a washer on each side of the crank arm and to thereby maintain the axle substantially parallel to the rotational axis of the sprocket.

17. The apparatus of claim 16 further comprising a resilient bumper mounted on the axle adjacent to the outside of the crank arm, and an outer stop attached to the crank arm and located such that the bumper contacts the outer stop when the axle moves to the outer end of the slot.

18. The apparatus of claim 17 further comprising an inner stop attached to the crank arm and located such that the bumper contacts the inner stop when the axle moves to the inner end of the slot.

19. The apparatus of claim 17 wherein the bumper has a truncated conical shape with a wider end thereof located adjacent to the crank arm, and wherein the outer stop has a corresponding shape to receive the bumper.

20. The apparatus of claim 9 wherein the bias element comprises a spring located in a recess in the crank arm extending between the inner end of the slot and the rotational axis of the sprocket, and wherein the spring is attached at an outer end thereof to the axle and is attached at an inner end thereof to the crank arm, and wherein the spring is removably attached such that a first spring having a first strength can be removed and replaced by a second spring having a second strength different from the first strength.

* * * * *